(12) United States Patent
Bukspan et al.

(10) Patent No.: US 9,742,702 B1
(45) Date of Patent: *Aug. 22, 2017

(54) END-TO-END CACHE FOR NETWORK ELEMENTS

(71) Applicant: MELLANOX TECHNOLOGIES LTD., Yokneam (IL)

(72) Inventors: Ido Bukspan, Herzliya (IL); Oded Wertheim, Zichron Yaakov (IL); Benny Koren, Zichron Yaakov (IL); Itamar Rabenstein, Petah Tikva (IL); Amiad Marelli, Tel Aviv (IL); Omri Flint, Ramat Hasharon (IL); Dror Aharoni, Rishon Lezion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,142

(22) Filed: Jul. 30, 2015

Related U.S. Application Data

(63) Continuation of application No. 13/609,378, filed on Sep. 11, 2012, now Pat. No. 9,130,885.

(51) Int. Cl.
*H04L 12/747* (2013.01)
*H04L 12/935* (2013.01)
*H04L 12/46* (2006.01)
*H04L 12/931* (2013.01)

(52) U.S. Cl.
CPC .......... *H04L 49/30* (2013.01); *H04L 12/4641* (2013.01); *H04L 49/3063* (2013.01); *H04L 49/354* (2013.01)

(58) Field of Classification Search
None
See application file for complete search history.

(56) References Cited

U.S. PATENT DOCUMENTS

| | | | |
|---|---|---|---|
| 5,235,642 A * | 8/1993 | Wobber ............... | G06F 21/31 713/156 |
| 5,790,522 A | 8/1998 | Fichou et al. | |
| 5,917,947 A | 6/1999 | Ishida et al. | |
| 6,160,814 A | 12/2000 | Ren et al. | |
| 6,324,165 B1 | 11/2001 | Fan | |
| 6,633,395 B1 | 10/2003 | Tuchitoi | |

(Continued)

OTHER PUBLICATIONS

U.S. Appl. No. 14/207,680 Office Action dated Sep. 25, 2015.

*Primary Examiner* — Gregory Sefcheck
*Assistant Examiner* — Jenkey Van
(74) *Attorney, Agent, or Firm* — D. Kligler IP Services Ltd.

(57) ABSTRACT

A method in a network element includes processing input packets using a set of two or more functions that are defined over parameters of the input packets. Each function in the set produces respective interim actions applied to the input packets and the entire set produces respective end-to-end actions applied to the input packets. An end-to-end mapping, which maps the parameters of at least some of the input packets directly to the corresponding end-to-end actions, is cached in the network element. The end-to-end mapping is queried with the parameters of a new input packet. Upon finding the parameters of the new input packet in the end-to-end mapping, an end-to-end action mapped to the found parameters is applied to the new input packet, without processing the new input packet using the set of functions.

20 Claims, 2 Drawing Sheets

(56) References Cited

U.S. PATENT DOCUMENTS

| | | |
|---|---|---|
| 6,771,654 B1 | 8/2004 | Sang et al. |
| 7,027,457 B1 | 4/2006 | Chiussi et al. |
| 7,334,065 B1 | 2/2008 | Rose et al. |
| 7,747,086 B1 | 6/2010 | Hobbs et al. |
| 7,856,026 B1 | 12/2010 | Finan et al. |
| 8,352,648 B1 | 1/2013 | Puranik |
| 8,923,337 B2 | 12/2014 | Singh |
| 2002/0019916 A1 | 2/2002 | Henrion |
| 2002/0067695 A1 | 6/2002 | Skarpness et al. |
| 2002/0167955 A1 | 11/2002 | Shimojo |
| 2002/0176432 A1 | 11/2002 | Courtney et al. |
| 2003/0016697 A1 | 1/2003 | Jordan |
| 2003/0043828 A1 | 3/2003 | Wang et al. |
| 2003/0065812 A1* | 4/2003 | Beier ............ H04L 29/12339 709/236 |
| 2003/0120894 A1 | 6/2003 | Wang |
| 2003/0123392 A1 | 7/2003 | Ruutu et al. |
| 2003/0222860 A1 | 12/2003 | Yamaura |
| 2003/0223435 A1 | 12/2003 | Gil |
| 2004/0037558 A1 | 2/2004 | Beshai |
| 2004/0202169 A1 | 10/2004 | Mukouyama et al. |
| 2005/0063370 A1 | 3/2005 | Beshai et al. |
| 2005/0076138 A1* | 4/2005 | Sterne ................ H04L 45/00 709/238 |
| 2005/0125424 A1* | 6/2005 | Herriott ................ H04L 69/22 |
| 2005/0129033 A1 | 6/2005 | Gordy et al. |
| 2005/0144553 A1* | 6/2005 | Bass ................ G06F 17/30985 715/231 |
| 2005/0259574 A1 | 11/2005 | Figueira et al. |
| 2006/0095609 A1 | 5/2006 | Radhakrishnan et al. |
| 2007/0015525 A1 | 1/2007 | Beming et al. |
| 2007/0019553 A1 | 1/2007 | Sagfors et al. |
| 2007/0274215 A1 | 11/2007 | Gusat et al. |
| 2008/0259936 A1* | 10/2008 | Hussain ............ H04L 12/5693 370/397 |
| 2009/0182944 A1* | 7/2009 | Comparan ........ G06F 12/0888 711/122 |
| 2010/0057953 A1 | 3/2010 | Kim et al. |
| 2010/0088756 A1* | 4/2010 | Balakrishnan ...... H04L 63/0245 726/13 |
| 2012/0072635 A1 | 3/2012 | Yoshida et al. |
| 2012/0106562 A1 | 5/2012 | Laor et al. |
| 2012/0144064 A1 | 6/2012 | Parker et al. |
| 2013/0212296 A1* | 8/2013 | Goel ................ H04L 45/7453 709/238 |
| 2014/0095745 A1 | 4/2014 | Kawahara et al. |
| 2014/0204742 A1 | 7/2014 | Pandit |
| 2014/0286349 A1 | 9/2014 | Kitada |
| 2014/0289568 A1 | 9/2014 | Koyama et al. |
| 2014/0310354 A1 | 10/2014 | Fountain et al. |
| 2015/0026309 A1 | 1/2015 | Radcliffe et al. |
| 2015/0058857 A1 | 2/2015 | Sandstrom |
| 2015/0103667 A1 | 4/2015 | Elias |

\* cited by examiner

END-TO-END CACHE FOR NETWORK ELEMENTS

CROSS-REFERENCE TO RELATED APPLICATION

This application is a continuation of U.S. patent application Ser. No. 13/609,378, filed Sep. 11, 2012.

FIELD OF THE INVENTION

The present invention relates generally to communication networks, and particularly to methods and systems for caching in network elements.

BACKGROUND OF THE INVENTION

Packet communication networks commonly use network elements such as switches and routers for processing packets. Network elements perform various packet processing functions, such as filtering, forwarding, routing, policing, tunneling and queuing, among others.

SUMMARY OF THE INVENTION

An embodiment of the present invention that is described herein provides a method in a network element. The method includes processing input packets using a set of two or more functions that are defined over parameters of the input packets. Each function in the set produces respective interim actions applied to the input packets and the entire set produces respective end-to-end actions applied to the input packets. An end-to-end mapping, which maps the parameters of at least some of the input packets directly to the corresponding end-to-end actions, is cached in the network element. The end-to-end mapping is queried with the parameters of a new input packet. Upon finding the parameters of the new input packet in the end-to-end mapping, an end-to-end action mapped to the found parameters is applied to the new input packet, without processing the new input packet using the set of functions.

In some embodiments the method includes, upon determining that the parameters of the new input packet are not cached in the end-to-end mapping, processing the new input packet using the set of functions. Typically, processing the new input packet includes updating the end-to-end mapping with the end-to-end action produced by the set for the new input packet. In an embodiment, the interim actions and the end-to-end actions include actions that affect packet destinations, and/or modifications applied to the packets.

In a disclosed embodiment, processing the input packets includes applying first and second different configurations of the set of functions to respective first and second input packets. Applying the different configurations may include applying to the first input packet only a single function from the set. In some embodiments the method includes, upon applying the end-to-end action to the new input packet using the end-to-end mapping, updating data in the network element that would be updated if the new input packet were processed by the set of functions.

There is additionally provided, in accordance with an embodiment of the present invention, a network element including one or more ports that are configured for receiving and transmitting packets, and packet processing circuitry. The packet processing circuitry is configured to receive input packets via the ports, to process the input packets using a set of two or more functions that are defined over parameters of the input packets, such that each function in the set produces respective interim actions applied to the input packets and the entire set produces respective end-to-end actions applied to the input packets, to cache an end-to-end mapping that maps the parameters of at least some of the input packets directly to the corresponding end-to-end actions, to query the end-to-end mapping with the parameters of a new input packet, and, upon finding the parameters of the new input packet in the end-to-end mapping, to apply to the new input packet an end-to-end action mapped to the found parameters, without processing the new input packet using the set of functions.

There is also provided, in accordance with an embodiment of the present invention, apparatus including a memory and circuitry. The circuitry is configured to process input packets using a set of two or more functions that are defined over parameters of the input packets, such that each function in the set produces respective interim actions applied to the input packets and the entire set produces respective end-to-end actions applied to the input packets, to cache in the memory an end-to-end mapping that maps the parameters of at least some of the input packets directly to the corresponding end-to-end actions, to query the end-to-end mapping with the parameters of a new input packet, and, upon finding the parameters of the new input packet in the end-to-end mapping, to apply to the new input packet an end-to-end action mapped to the found parameters, without processing the new input packet using the set of functions.

The present invention will be more fully understood from the following detailed description of the embodiments thereof, taken together with the drawings in which:

DETAILED DESCRIPTION OF EMBODIMENTS

Overview

Figure 1:
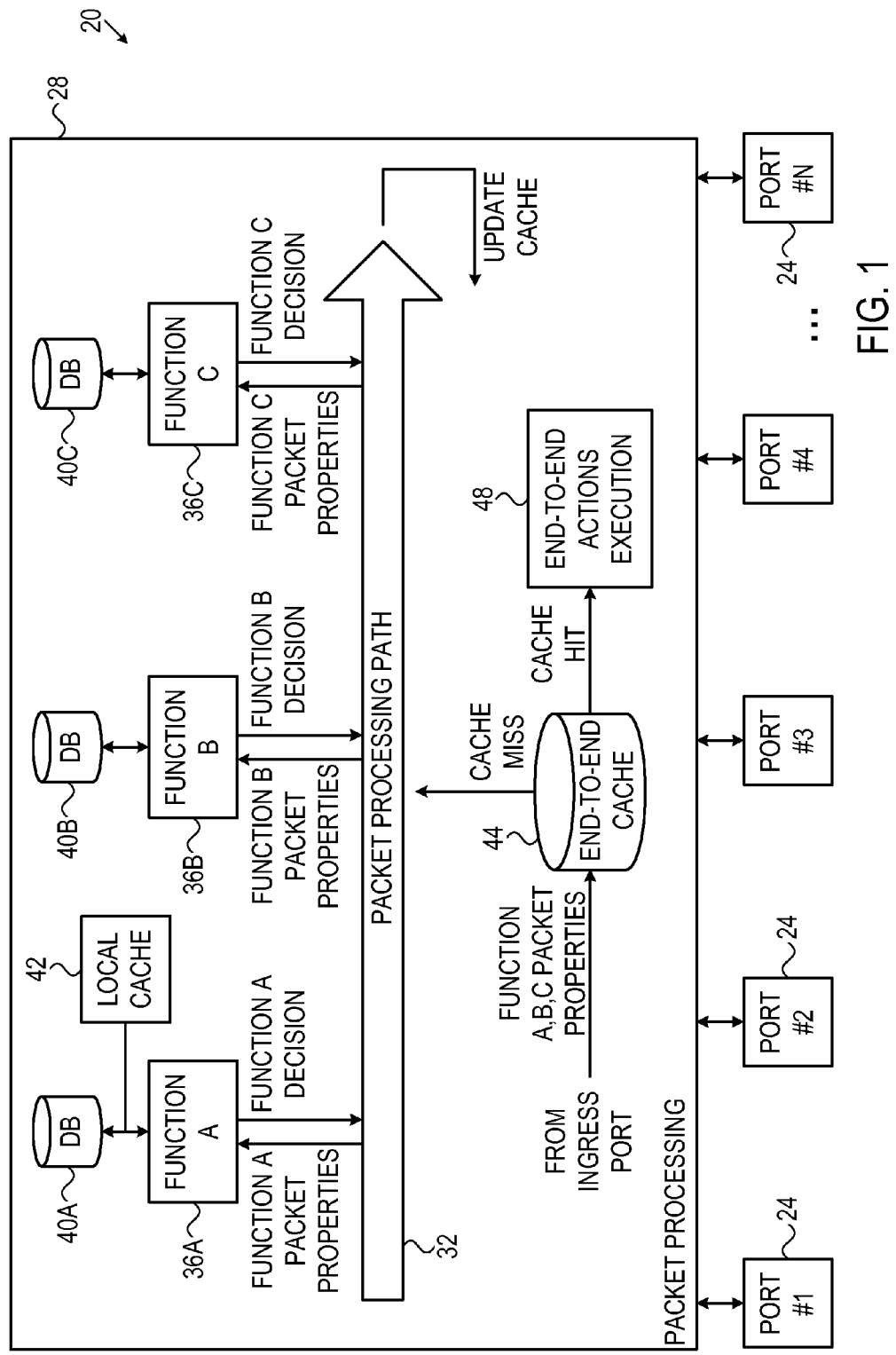
FIG. 1 is a block diagram that schematically illustrates a network element, in accordance with an embodiment of the present invention.

Embodiments of the present invention that are described herein provide improved methods and systems for processing communication packets in network elements. In some embodiments, a network element processes input packets using a set of functions. The functions may comprise, for example, ingress and/or egress Access Control Lists (ACLs), filtering rules, forwarding, routing, mirroring, tunneling and many others.

Each function in the set is defined over one or more parameters of the input packets, such as packet properties, metadata or some stateless or stateful context. Each individual function produces interim actions to be applied to the input packets, and the set as a whole produces end-to-end actions to be applied to the input packets. The interim and end-to-end actions may involve, for example, forwarding decisions (e.g., a transmit queue—TQ—over which to send the packet) as well as setting of packet attributes (e.g., Virtual Local Area Network—VLAN or priority) and/or modification of packet header fields.

In addition to the set of functions, the network element maintains an end-to-end cache, which caches a direct mapping of input packet parameters to the corresponding endto-end actions. The mapping is direct in the sense that it does not distinguish between individual functions and interim actions, but rather gives the end-to-end action specified by the entire set for a certain combination of packet parameters.

When a new input packet arrives, the network element queries the end-to-end cache with the parameters of the new input packet. If the parameters of the new input packet are found in the end-to-end cache, the network element reads the corresponding end-to-end action from the cache, and applies this end-to-end action to the new input packet. This process is performed using only the end-to-end cache, without applying the set of functions. When the end-to-end action is applied using the end-to-end cache, the network element typically updates any relevant databases or other elements that are normally updated by the set of functions, such that the caching mechanism is transparent.

Otherwise, if the parameters of the new input packet are not found in the end-to-end cache, the network element reverts to process the new input packet using the set of functions. Then, the network element typically updates the end-to-end cache with a new entry that maps the parameters of the new input packet to the end-to-end action. From this point, subsequent packets having the same parameters can be processed using the end-to-end cache instead of using the set of functions.

Processing a packet using the end-to-end cache is considerably faster and simpler than processing a packet using the set of functions. Processing a packet using the end-to-end cache also reduces the workload of the set of functions, and therefore reduces power consumption. Thus, the disclosed techniques help to reduce the latency, computational complexity and power consumption of network elements.

Moreover, for packets that are processed using the cache, the disclosed techniques provide constant and small latency that does not depend on the number and types of the individual functions. In some embodiments, the set of functions and/or the connectivity between them may change from one packet to another. As such, the set of functions may have different latencies for different packets. The end-to-end caching mechanism, however, has a latency that is independent of the set of functions it replaces for a given packet.

Network Element Description

FIG. 1 is a block diagram that schematically illustrates a network element 20, in accordance with an embodiment of the present invention. Network element 20 may comprise, for example, a network switch, a router, or any other suitable type of network element that processes communication packets. In an alternative embodiment, network element 20 may comprise a network interface such as a Network Interface Card (NIC) or Host Channel Adapter (HCA).

Network element 20 may operate in any suitable communication network, and in accordance with any suitable communication protocol. Example protocols may comprise Ethernet or Infiniband. Depending on the protocol, packets may also be referred to as frames or cells, for example.

Network element 20 comprises multiple ports 24, over which the network element receives input packets (also referred to as ingress packets) from the communication network and sends output packets (also referred to as egress packets) to the communication network. In addition, the network element comprises packet processing circuitry 28, which processes the packets. In a typical flow, processing circuitry 28 receives an input packet from one of ports 24 that is referred to as an ingress port, applies certain processing to the packet, and forwards the packet over one of ports 24 that is referred to as an egress port.

Circuitry 28 comprises a packet processing path 32, which applies a set of two or more functions to the input packets. In the present example, the packet processing path comprises a cascade of three functions 36A . . . 36C, denoted FUNCTION A, FUNCTION B and FUNCTION C.

The embodiments described herein refer mainly to functions that are arranged in cascade, for the sake of clarity. Generally, however, packet processing path 32 may comprise any suitable number and any suitable types of functions, which are applied to the input packets in series, in parallel, nested in one another, arranged in feedback configurations, or in any other suitable order or hierarchy.

Moreover, in some embodiments, packet processing path 32 may vary from one packet to another, for example based on criteria or rules related to the packet. The variations in the packet processing path may involve changes in the number of functions, in the order or connectivity between the functions, or in any other suitable way. Put in another way—The processing path may comprise multiple paths of functions, and different packets may traverse different paths. In some embodiments, for certain packets, for certain time periods or under certain conditions, the packet processing path may comprise a single function. The end-to-end caching mechanism replaces any such paths, often without knowledge of the actual functions or path structures it replaces.

Functions 36A . . . 36B may comprise, for example, stateless filtering of packets, ingress and/or egress rules such as Access Control Lists (ACLs), forwarding decision functions, routing decision functions, policing, tunneling, mirroring, queuing decision functions, or any other suitable type of function.

Each of functions 36A . . . 36C is defined over one or more packet parameters, and produces interim actions to be applied to the packets. In other words, each function typically maps various combinations of packet parameters to corresponding interim actions, which are to be applied to packets having these parameters.

Packet parameters may comprise, for example, properties of the packet (e.g., packet header field values or packet size), metadata (e.g., properties of the ingress port), additional stateful context, and/or any other suitable parameter.

The interim actions produced by the functions may comprise, for example, forwarding or routing decisions (e.g., an egress port or transmit queue—TQ—to which the packet should be sent), setting of packet properties (e.g., a Virtual Local Area Network—VLAN—tag for the packet, or a priority to be assigned to the packet), or any other suitable action. In many cases, e.g., when the functions are cascaded, the interim action of one function is used as input to another function.

For a given input packet, the set of functions as a whole can be viewed as producing a respective end-to-end action that is applied to the packet. Similarly to the interim actions, the end-to-end action may involve forwarding or routing decisions, setting of packet properties, or any other suitable actions.

Generally speaking, the interim actions and the end-to-end actions can be classified into actions that affect the packet destinations (e.g., forwarding, routing, filtering, mirroring, assuming that discarding a packet is also regarded as affecting its destination), and actions that modify the packets.

In some embodiments, processing circuitry 28 comprises databases (DB) 40A . . . 40C that are coupled locally to functions 36A ... 36C, respectively. In the present example all three functions comprise databases. In alternative embodiments, only part of the functions may use such databases. The database of a given function is typically accessed by packet properties, and returns information used by the function. Packets that differ in properties that are not inspected by the function (and are thus not used for accessing the database) are thus considered equal from the function's perspective. Each of databases 40A ... 40C may be implemented using a table, a Content Addressable Memory (CAM), a Ternary CAM (TCAM), multiple sequential table lookups, external memory access, or in any other suitable way.

In some embodiments, one or more of the functions may comprise a local cache 42 that reduces the number of database lookups by the function. FIG. 1 shows a local cache only for function 36A, by way of example.

In addition to processing path 32 and functions 36A ... 36C, network element 20 comprises an end-to-end cache memory 44. Cache 44 holds a direct mapping of input packet parameters to the corresponding end-to-end actions. The term "direct mapping" means that the mapping does not distinguish between the individual functions and interim actions. Instead, the mapping in cache 44 gives the end-to-end action produced by processing path 32 as a whole for a certain combination of packet parameters.

In the example of FIG. 1, the end-to-end cache is typically accessed with the union of packet parameters used by FUNCTION A, FUNCTION B and FUNCTION C. An action execution unit 48 executes the end-to-end actions read from cache 44.

The entries of end-to-end cache 44 are added progressively during operation: When a new input packet enters network element 20, processing circuitry 28 queries the end-to-end cache with the parameters of the new input packet. If the parameters of the new input packet are found in the end-to-end cache ("cache hit"), the processing circuitry reads the corresponding end-to-end action from cache 44, and unit 48 applies the end-to-end action to the new input packet. This process is performed using only the end-to-end cache, without applying packet processing path 32.

If the parameters of the new input packet are not found in end-to-end cache 44 ("cache miss"), then processing circuitry 28 reverts to process the new input packet using the packet processing path, i.e., to apply the set of functions. The packet processing path produces an end-to-end action that is then applied to the packet.

Typically, packet processing circuitry 28 updates end-to-end cache 44 with this end-to-end action, i.e., creates a new entry that maps the parameters of the new input packet to the end-to-end action. From this point onwards, subsequent packets having the same parameters will be processed by circuitry 28 using the end-to-end cache instead of using the packet processing path.

In an example embodiment, the various functions, databases, packet parameters and interim actions are defined as follows:

TABLE 1

Example packet processing path

| # | FUNCTION A | FUNCTION B | FUNCTION C |
|---|---|---|---|
| Function type | Ingress ACL | Layer 2 forwarding | Egress ACL |
| Database type | TCAM | Forwarding database (FDB) | TCAM |

TABLE 1-continued

Example packet processing path

| # | FUNCTION A | FUNCTION B | FUNCTION C |
|---|---|---|---|
| Packet parameters | RQ, SIP | MAC, VLAN (300) | TQ, Ethertype |
| Interim action | Set VLAN to 300 | TQ = 7 | Set priority to 3 |

In this embodiment, end-to-end cache 44 is accessed by {RQ, SIP, MAC, Ethertype}. In case of cache hit, cache outputs the end-to-end action {Set VLAN to 300, set priority to 3, forward to TQ=7}. The example above is a highly simplified example, which is chosen purely for the sake of conceptual clarity. In alternative embodiments, any other suitable functions and end-to-end cache structure can be used.

The network element configuration shown in FIG. 1 is an example configuration, which is chosen purely for the sake of conceptual clarity. In alternative embodiments, any other suitable network element configuration can be used. Certain elements of processing circuitry 28 may be implemented using hardware, such as using one or more Application-Specific Integrated Circuits (ASICs) or Field-Programmable Gate Arrays (FPGAs). Alternatively, some processing circuitry elements may be implemented in software or using a combination of hardware and software elements. End-to-end cache 44 and databases 40A ... 40C may be implemented using any suitable type of memory devices.

In some embodiments, certain functions of packet processing circuitry 28 may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Packet Processing Method Description

Figure 2:
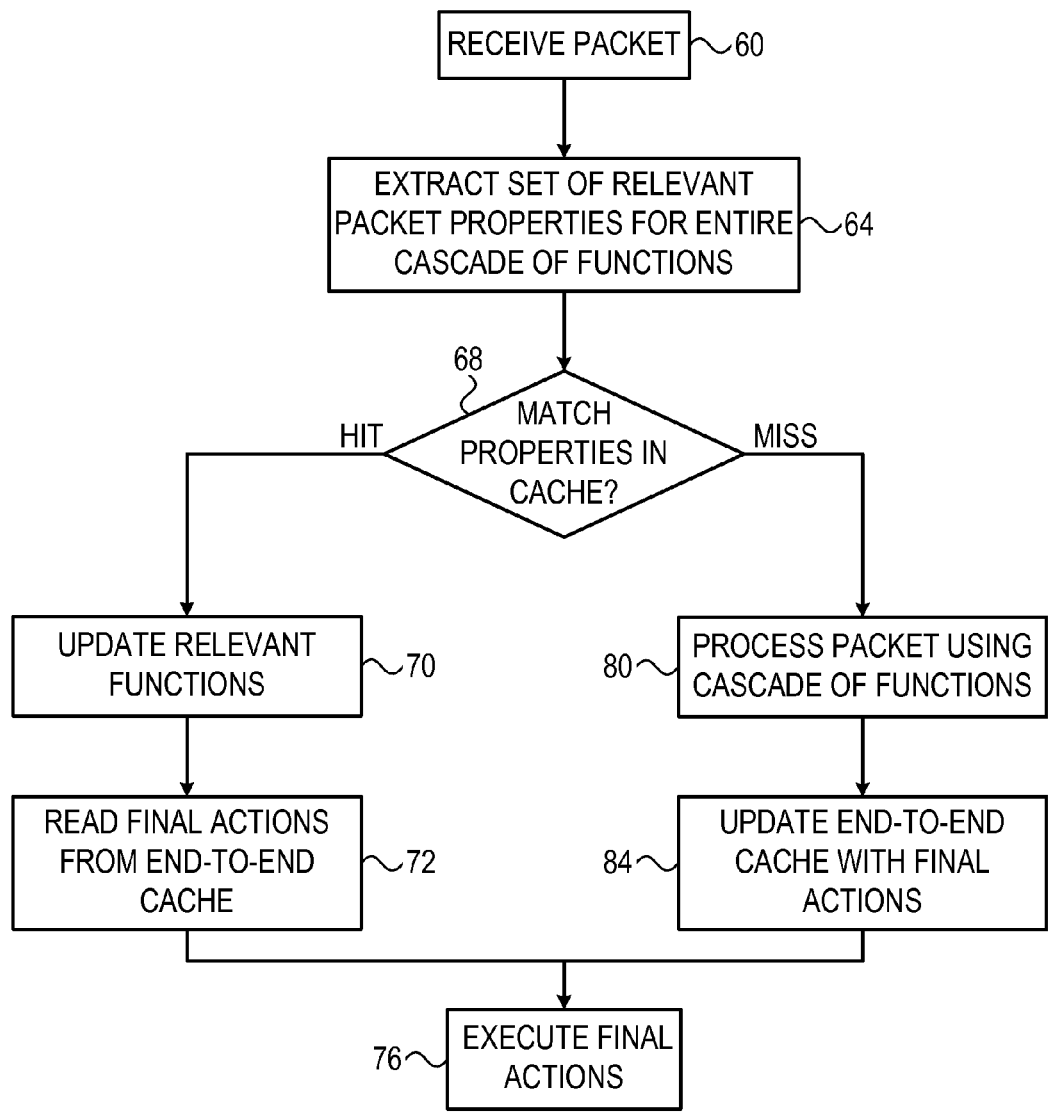
FIG. 2 is a flow chart that schematically illustrates a method for packet processing in a network element, in accordance with an embodiment of the present invention.

FIG. 2 is a flow chart that schematically illustrates a method for packet processing in network element 20, in accordance with an embodiment of the present invention. The method begins with network element 20 receiving an input packet over one of ports 24, at an ingress step 60.

Processing circuitry 28 extracts relevant packet properties, at a property extraction step 64. In some embodiments, processing circuitry 28 classifies the packet so as to extract the packet properties that are relevant to the particular packet. The processing circuitry then looks for an entry of cache 44 that matches the packet properties, at a cache checking step 68.

If a matching entry is found ("cache hit"), processing circuitry 28 first performs any update in the network element that is normally performed by the packet processing path, at a function updating step 70. This updating is performed so that the caching mechanism is transparent, i.e., such that all data in the network element will be updated in the same way regardless of whether the packet is processed by the cache or by the processing path. Processing circuitry 28 then reads the corresponding end-to-end action from cache 44, at a cache readout step 72. Execution unit 48 executes the end-to-end action, at an execution step 76.

If, on the other hand, a matching entry is not found at step 68 ("cache miss"), processing circuitry 28 calculates the end-to-end action using processing path 32 and functions 36A . . . 36B, at a path processing step 80. The processing circuitry updates end-to-end cache 44 with the newly-calculated end-to-end action, at a cache updating step 84. Execution unit 48 executes this end-to-end action at execution step 76.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
providing a network element, including a set of two or more hardware implemented function units that are each defined over parameters of input packets to determine a forwarding decision or a packet modification, such that each function unit in the set produces respective interim actions applied to input packets and the entire set produces respective end-to-end actions applied to input packets;
caching in the network element an end-to-end mapping cache, which maps the parameters of at least some input packets directly to the corresponding end-to-end actions;
receiving a new input packet in the network element; and querying the end-to-end mapping cache with parameters of the received new input packet, and,
upon finding the parameters of the new input packet in the end-to-end mapping cache, applying to the new input packet an end-to-end action mapped to the parameters of the new input packet, without processing the new input packet using the set of function units, and
upon determining that the parameters of the input packet are not cached in the end-to-end mapping cache processing the input packet by the set of function units, wherein processing the new input packet comprises updating the end-to-end mapping cache with the end-to-end action produced by the set of function units for the new input packet,
wherein at least one of the function units is configured to update a database when handling packets and wherein the end-to-end action includes updating the database as it would have been updated by the function unit, and
wherein the applying of the end-to-end action to the new input packet is performed transparently, such that data in the network element is updated in the same way regardless of whether the new input packet is processed by the end-to-end action or by the function units.

2. The method according to claim 1, wherein processing the input packets comprises applying first and second different configurations of the set of function units to respective first and second input packets.

3. The method according to claim 2, wherein applying different configurations comprises applying to the first input packet only a single function unit from the set.

4. The method according to claim 1, and comprising, upon applying the end-to-end action to the new input packet using the end-to-end mapping cache, updating data in the network element that would be updated if the new input packet were processed by the set of function units.

5. The method according to claim 1, wherein querying the end-to-end mapping cache with the parameters of a new input packet comprises querying with a union of the parameters over which the two or more function units are defined.

6. The method according to claim 1, wherein the two or more function units are defined over different parameters of the input packets.

7. The method according to claim 1, wherein one or more of the hardware implemented function units has a local cache, not used in the end-to-end mapping.

8. The method according to claim 1, wherein each of the hardware implemented function units is implemented using a separate table in a respective separate memory.

9. A network element, comprising:
one or more ports, which are configured to receive and transmit packets; a set of two or more separate hardware-implemented function units that are each defined over parameters of the input packets to determine a forwarding decision or a packet modification;
an end-to-end mapping cache that maps parameters of packets with corresponding end-to-end actions, which would be applied to the packet if handled by the set of two or more separate hardware implemented function units; and
packet processing circuitry, which is configured to receive input packets via the ports, to query the end-to-end mapping cache with parameters of a new input packet, and,
upon finding the parameters of the new input packet in the end-to-end mapping, to apply to the new input packet an end-to-end action mapped to the found parameters, without processing the new input packet using the set of function units, and
upon determining that the parameters of the new input packet are not cached in the end-to-end mapping cache, handling the packet by each of the hardware implemented function units in the set, and updating the end-to-end mapping cache with the end-to-end action produced by the set of hardware implemented function units for the new input packet,
wherein at least one of the function units is configured to update a database when handling packets and wherein the end-to-end action includes updating the database as it would have been updated by the function unit, and
wherein the applying of the end-to-end action to the new input packet is performed transparently, such that data in the network element is updated in the same way regardless of whether the new input packet is processed by the end-to-end action or by the function units.

10. The network element according to claim 9, wherein the packet processing circuitry is configured to apply first and second different configurations of the set of function units to respective first and second input packets.

11. The network element according to claim 10, wherein the packet processing circuitry is configured to apply to the first input packet only a single function unit from the set.

12. The network element according to claim 9, wherein, upon applying the end-to-end action to the new input packet using the end-to-end mapping cache, the packet processing circuitry is configured to update data in the network element that would be updated if the new input packet were processed by the set of function units.

13. The network element according to claim 9, wherein the packet processing circuitry is configured to query the end-to-end mapping cache with a union of the parameters over which the two or more function units are defined.

14. The network element according to claim 9, wherein the two or more function units are defined over different parameters of the input packets.

15. The network element according to claim 9, wherein each of the hardware-implemented function units has its own memory unit storing a respective database.

16. Apparatus, comprising:
   a set of two or more separate hardware-implemented function units that are each defined over parameters of the input packets to determine a forwarding decision or a packet modification;
   a memory storing an end-to-end mapping that maps parameters of packets with corresponding end-to-end actions, which would be applied to the packet if handled by the set of two or more separate hardware implemented function units; and
   circuitry, which is configured to query the end-to-end mapping with parameters of a new input packet, and, upon finding the parameters of the new input packet in the end-to-end mapping, to apply to the new input packet an end-to-end action mapped to the found parameters, without processing the new input packet using the set of function units, and upon determining that the parameters of the new input packet are not cached in the end-to-end mapping, handling the packet by each of the hardware implemented function units in the set, and update the end-to-end mapping with the end-to-end action produced by the set of hardware implemented function units for the new input packet, wherein at least one of the function units is configured to update a database when handling packets and wherein the end-to-end action includes updating the database as it would have been updated by the function unit, and wherein the applying of the end-to-end action to the new input packet is performed transparently, such that data in the network element is updated in the same way regardless of whether the new input packet is processed by the end-to-end action or by the function units.

17. The apparatus according to claim 16, wherein the circuitry is configured to apply first and second different configurations of the set of function units to respective first and second input packets.

18. The apparatus according to claim 17, wherein the circuitry is configured to apply to the first input packet only a single function unit from the set.

19. The apparatus according to claim 16, wherein, upon applying the end-to-end action to the new input packet using the end-to-end mapping, the circuitry is configured to update data in the apparatus that would be updated if the new input packet were processed by the set of function units.

20. The apparatus according to claim 16, wherein the circuitry is configured to query the end-to-end mapping with a union of the parameters over which the two or more function units are defined.

\* \* \* \* \*